United States Patent Office 3,301,895
Patented Jan. 31, 1967

3,301,895
PROCESS FOR THE PREPARATION OF
CARBODIIMIDES
Adnan A. R. Sayigh, North Haven, and Henri Ulrich,
Northford, Conn., assignors to The Upjohn Company,
Kalamazoo, Mich., a corporation of Delaware
No Drawing. Filed Jan. 31, 1963, Ser. No. 255,169
13 Claims. (Cl. 260—551)

This invention relates to a process for the preparation of carbodiimides, and is more particularly concerned with a process for the preparation of a carbodiimide of the formula:

$$R-N=C=N-R' \qquad I$$

wherein R is aryl of 6 to 12 carbon atoms, inclusive, and with zero to 3 substituents, inclusive, said substituents being unreactive with phosgene, and wherein R is selected from the group consisting of aryl of 6 to 12 carbon atoms, inclusive, alkyl of 1 to 18 carbon atoms, inclusive, and cycloalkyl of 3 to 12 carbon atoms, inclusive, said aryl, alkyl, and cycloalkyl each having zero to 3 substituents, inclusive, said substituents being unreactive with phosgene. When R and R' are both aryl, they may be the same or different.

The novel process of this invention involves a two-stage reaction of substantially equal molecular amounts of phosgene and a thiourea of the formula:

$$\begin{array}{c} S \\ \| \\ R-NH-C-NH-R' \end{array} \qquad II$$

wherein R and R' are as defined above. These two reactants are mixed, preferably in the presence of an inert solvent, under substantially anhydrous conditions, in the absence of a substantial amount of an acid acceptor, i.e., a base, and within the range of about 0° to about 60° C. After maintaining the resulting mixture within this temperature range until this first stage of the reaction is substantially complete, the temperature of the mixture is raised to within the range about 75° to about 200° C., and the second reaction stage is allowed to proceed to completion.

Examples of aryl of 6 to 12 carbon atoms, inclusive, are phenyl, 1-naphthyl, 2-naphthyl, and the isomeric forms of diphenyl, phenanthryl, and anthracenyl. Examples of alkyl of 1 to 18 carbon atoms, inclusive, are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, and isomeric forms thereof. Examples of cycloalkyl of 3 to 12 carbon atoms, inclusive, are cyclopropyl, cyclobutyl, cyclopentyl, cyclohexyl, cycloheptyl, cyclooctyl, cyclononyl, cyclodecyl, cycloundecyl, and cyclododecyl, as well as bicyclic and tricyclic radicals which may be considered as having been derived by removal of a hydrogen atom from such bicyclic and tricyclic hydrocarbons as bicyclo[2.2.1]heptane, bicyclo[3.2.1]octane, decalin, bicyclo[2.2.2]octane, and perhydrophenanthrene.

Up to 3 substituents can be present on each of the R and R' in the thiourea reactant of Formula II and in the carbodiimide product of Formula I. Because said thiourea reactant is reacted with phosgene, said substituents must be unreactive with phosgene. The term "unreactive with phosgene" is intended to mean that in the transformation of thiourea II to carbodiimide I, the probability that a particular substituent will survive unchanged is at least 0.95. Examples of substituents which are sufficiently unreactive to phosgene and which may be present on an aryl, alkyl, or cycloalkyl moiety of a Formula II thiourea are alkyl, e.g., methyl, butyl, and decyl; halo, e.g., fluoro, chloro, bromo, iodo; dialkylamino, e.g., dimethylamino, diethylamino, dihexylamino; nitro; cyano; alkoxycarbonyl, e.g., methoxycarbonyl, propoxycarbonyl, nonoxycarbonyl; and the like. Alkoxy, e.g., methoxy, ethoxy, and pentoxy; and alkylthio, e.g., methylthio, butylthio, and heptylthio, may also be present on an aryl moiety of a Formula II thiourea. An important criterion with regard to permissible substituents is that they not contain hydrogen atoms attached to atoms other than carbon, e.g., oxygen, sulfur, and nitrogen. Examples of substituted aryl groups which may be part of Formula II thioureas as defined above are o-tolyl, m-tolyl, p-tolyl, o-ethylphenyl, mesityl, 3,5 - dichlorophenyl, 4 - chloro - 1 - naphthyl, 4 - fluoro - 2 - anthracenyl, 4 - phenyl - 2 - methoxyphenyl, p-dimethylaminophenyl, m-nitrophenyl, p-cyanophenyl, 2-chloro-4-cyano-6-methylphenyl, 4-methoxycarbonyl-9-phenanthryl, and the like. Examples of substituted alkyl groups which may be part of Formula II thioureas as defined above are 2-cyanoethyl, 4-chlorobutyl, 5-nitrohexyl, 4-diethylaminopentyl, 3,3,3-trifluoropropyl, 10-ethoxycarbonyldecyl, and the like. Examples of substituted cycloalkyl groups which may be part of Formula II thioureas as defined above are 2-ethylcyclopentyl, 4-bromocyclohexyl, 2-ethoxycarbonylcyclooctyl, 2,2,4-trimethylcyclobutyl, and the like.

It is postulated that the aforementioned first stage of the novel process of this invention involves the production of one or two transient intermediates of the formulas

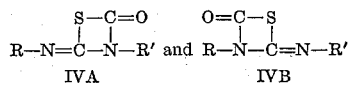

IIIA      IIIB and which, shortly after one or both are formed, are transformed during said first stage to a mixture of compounds of the formulas:

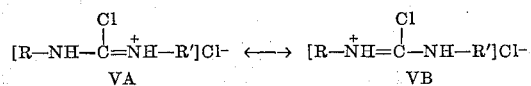

IVA      IVB

[R—NH—C=NH—R']Cl⁻  ⟷  [R—NH=C—NH—R']Cl⁻

VA      VB

Compounds of Formulas VA and VB are symbolized as such for convenience and, together, probably are more accurately designated a single resonance hybrid wherein the positive charge is distributed between two nitrogen atoms. It is further postulated that the aforementioned second stage of the novel process of this invention involves the transformation of the mixture of intermediates IV and V into a single carbodiimide of Formula I. However, the novel process of this invention is not to be construed as being limited by these postulates and the reaction may actually proceed by another path, for example, by way of one or more intermediates of different formula. It does appear, however, that some intermediate or mixture of intermediates is formed within the relatively low reaction temperature range specificed above for the first stage and that, although some carbodiimide may be formed during the first stage from that first stage intermediate, the relatively higher reaction temperature range specified above for the second stage is generally necessary to cause the first stage intermediate to be transformed to a carbodiimide at an economically feasible reaction rate.

Carbodiimides are generally known to be highly reactive organic compounds and are useful as reactants in organic synthesis. For example, they have been used to cause the formation of esters from alcohols and carboxylic ac:ds (e.g., U.S. Patent 2,686,180), to cause the formation of pyrophosphate esters from phosphate esters

[e.g., Khorana et al., J. Chem. Soc., 2257–60 (1953)], and in the preparation of cellulose derivatives useful in textile sizing compositions (e.g., U.S. Patent 2,415,043).

The prior art relating to the preparation of carbodiimides has been described by Khorana in Chemical Reviews, 53, 145–51 (1953). As discussed therein, carbodiimides have previously been prepared by desulfurization of disubstituted thioureas, for example, by interaction of thioureas with various metal oxides or sodium hypochlorite. These methods are not entirely satisfactory, particularly because the yields are often low, and the products are often of low purity and difficult to purify. Also, the water which is a product in these old procedures reacts with the desired carbodiimide to produce a urea, thus resulting in a reduction in yield and an increase in contamination of the desired carbodiimide.

1,3-disubstituted thioureas have previously been reacted with phosgene [e.g., Will, Ber. Deut. Chem., 14, 1485–92 (1881); Freund et al., Ber. Deut. Chem. 25, 1456–68 (1892); Seefelder, German specification 1,119,258]. Both Will and Freund et al. disclose reacting certain 1,3-diaryl-2-thioureas with phosgene in the presence of benzene or toluene. For each such reaction, there is disclosed the isolation of a compound to which was assigned a molecular structure corresponding to Formula IV, above. Will also discloses that the Formula IV compound obtained by reacting phosgene with 1,3-diphenyl-2-thiourea yielded diphenylcarbodiimide when heated above its melting point. Seefelder also discloses the reaction of phosgene with certain 1,3-disubstituted thioureas in the presence of a solvent such as benzene. For each such reaction, there is disclosed the isolation of a compound to which was assigned a molecular structure corresponding to V, above. In a later German specification, 1,125,914, Seefelder et al. disclose the transformation of the Formula V compounds, whose isolation Seefelder discloses in German specification 1,119,258, to carbodiimides by low temperature reaction with water and/or an acid acceptor such as potassium hydroxide or triethylamine.

We have now made the surprising discovery that compounds of Formula V, as above defined, will form carbodiimides in high yield when heated in the range about 75° to about 200° C. in the absence of water and acid acceptors. We have also discovered that when a mixture of phosgene and a Formula II thiourea is maintained within the range about 0° to about 60° C., a mixture of products is formed. It is postulated that this product mixture contains both Formula IV and Formula V compounds. We have also discovered that this product mixture yields a corresponding Formula I carbodiimide in surprisingly high yield when heated within the range about 75° to about 200° C. in the absence of substantial amounts of water or acid acceptors.

It is readily apparent that the novel process of this invention has several outstanding advantages compared with the processes of Will and of Seefelder et al. For example, it is not necessary to isolate the Formula IV intermediate with the resultant loss of carbodiimide precursors which such an isolation procedure entails. Also, a carbodiimide is produced from more than one intermediate, i.e., according to our postulates, both from the Formula IV intermediate and from the Formula V intermediate, with a corresponding increase in yield. Further, the desired carbodiimide is kept out of contact with water and with acid acceptors, i.e., bases. The former reacts with carbodiimides to form ureas. The latter is known to accelerate the polymerization of carbodiimides.

In carrying out the novel process of this invention, it is not essential that the initial reaction mixture or the subsequent first-stage or second-stage reaction mixtures be maintained completely free of all moisture. For example, access of the reaction mixture to the moisture normally present in the atmosphere will not cause a substantial decrease in the amount of carbodiimide ultimately produced. It is desirable, however, to use reactants, reaction solvents, and reaction vessels which are substantially free of water. For example, it is desirable that no more than 0.01 mole of water per mole of phosgene be present in a reaction mixture. Preferably, less water should be present. The presence of more water will decrease the yield of the desired carbodiimide by reacting with it. It is also not essential that the reaction be carried out in the complete absence of all acid acceptors but merely that there be substantial freedom from acid acceptors. For example, it is desirable that no more than 0.01 mole of an acid acceptor per mole of phosgene be present in a reaction mixture. Preferably less acid acceptor should be present. The presence of more acid acceptor will decrease the yield of the desired carbodiimide, for example, by increasing its well-known tendency to polymerize.

Although the presence of a reaction solvent is not essential, particularly, if the thiourea of Formula II is a liquid at the first-stage reaction temperature, it is usually advantageous to dissolve or suspend the Formula II thiourea reactant in an inert solvent, and then to add a solution of phosgene in the same or a similarly inert solvent. Alternatively, a solvent can be used to dissolve or disperse the thiourea, and the desired amount of phosgene can then be added in gaseous form. Suitable solvents are aromatic hydrocarbons, e.g., benzene, toluene, xylene; aliphatic hydrocarbons, e.g., hexane, heptane, octane, mineral oil; cycloalkanes, e.g., cyclohexane, tetrahydronaphthalene, decalin; chlorinated hydrocarbons, e.g., chlorobenzene, chlorinated alkanes; dialkyl ethers of ethylene glycol and diethylene glycol, e.g., the dimethyl ethers; dialkyl sulfoxides, e.g., dimethyl sulfoxide; and the like. Especially preferred as reaction solvents are the normally fluid aromatic hydrocarbons and chlorinated aromatic hydrocarbons. Important criteria in the choice of a reaction solvent are that the solvent be a liquid over the entire desired reaction temperature range and that the solvent not react with the phosgene or with the desired carbodiimide. In general, solvents should be avoided which contain active hydrogen atoms as determined by the Zerewitinoff procedure [J. Am. Chem. Soc., 49, 3181 (1927)]. The amount of solvent to be used is not critical, it being desirable, however, that a reasonably fluid reaction mixture be maintained to facilitate contact between phosgene and the thiourea.

It is preferred to react substantially equal molecular amounts of phosgene and Formula II thiourea. Lesser or greated amounts of phosgene will result in smaller yield of the desired carbodiimide. When lesser amounts of phosgene are used, some of the thiourea remains unreacted. Excess phosgene tends to react with the Formula V intermediate when the latter has been formed, thus preventing it from being transformed to a carbodiimide.

Although the first stage of the novel process can be carried out within a temperature range about 0° to about 60° C., it is usually preferred to use a range about 35° to about 50° C. This latter particular temperature range encourages production of a relatively high proportion of what is postulated to be the Formula IV intermediate compared with what is postulated to be the Formula V intermediate, and the resulting first-stage reaction mixture then produces carbodiimide in somewhat higher yield. Moreover, first-stage reaction mixtures obtained within the preferred temperature range tend to be more fluid because they contain relatively smaller proportions of what is postulated to be the Formula V intermediate. This latter intermediate appears to have sufficient ionic character to be of relatively low solubility in the preferred aromatic hydrocarbon or chlorinated hydrocarbon solvents. The result is precipitation of this intermediate and formation of a thick sludge which is difficult to stir and otherwise transform to a carbodiimide in the second stage of the reaction. A first-stage reaction temperature higher than about 60° C. is undesirable because then there is an increased tendency toward production of relatively large amounts of undesired products including isothiocyanates and guanidine hydrochlorides with corresponding decreases in the carbodiimide yield in the second reaction stage. The temperature range for the second stage is not as critical as for the first stage, and temperatures ranging from about 75° to about 200° C. are operable although the best yields of carbodiimides are usually obtained between about 75° and about 150° C.

The times required for completion of the first and second stages of the novel reaction of this invention vary according to the nature of the thiourea reactant. Satisfactory results are usually obtained by a slow mixing of phosgene and the thiourea, for example, during about 20 to about 120 minutes within the relatively low first-stage temperature range. Although the first stage reaction usually proceeds to completion rapidly, it is desirable to maintain the reaction mixture within the first-stage temperature range for about 5 minutes to about 6 hours before starting the second stage of the reaction. The second stage usually requires heating with the higher temperature range for about 1 to 6 hours.

Hydrogen chloride gas is produced during the second reaction stage. Because hydrogen chloride tends to react rapidly with carbodiimides, it is preferred to remove hydrogen chloride from the reaction mixture as soon as it is formed. This can usually be done satisfactorily by passing an inert gas, for example, nitrogen or helium, through the reaction mixture during the entire second reaction stage. It is not essential to remove hydrogen chloride completely from the reaction mixture. Indeed, it has been found that small amounts of hydrogen chloride actually serve to stabilize the desired carbodiimide. This factor represents still another advantage of the novel process of this invention in comparison with the prior art methods of preparing carbodiimides.

The isolation of a carbodiimide from a second-stage reaction mixture can be carried out by conventional techniques, for example, by evaporation of the reaction solvent and distillation of the residue at reduced pressure. Alternatively, the carbodiimide can be isolated from said residue by chromatography. If the carbodiimide is normally a solid, it can be isolated and purified by crystallization from a suitable solvent or pair of solvents.

Symmetrical 1,3-disubstituted thioureas within the scope of Formula II are either known in the art or can be prepared by procedures known in the art, for example, by interaction of a primary amine and carbon disulfide [e.g., Hünig et al., Ann. 579, 7–86 (1953)]. Unsymmetrical 1,3-disubstituted thioureas within the scope of Formula II are also either known in the art or preparable by procedures known in the art, for example, by interaction of a primary amine and an isothiocyanate [e.g., Otterbacher, et al., J. Am. Chem. Soc., 51, 1909–11 (1929); Suter et al., J. Am. Chem. Soc. 55, 2497–9 (1933)].

The process of the invention can be more fully understood by the following examples.

EXAMPLE 1

A solution of phosgene (23 g.; 0.23 mole) in 100 ml. of benzene was added dropwise to a stirred mixture of 1,3-di-o-tolyl-2-thiourea (56.3 g.; .22 mole) and 450 ml. of benzene at about 45° C. during 25 minutes. After about five minutes of additional stirring at about 45° C., the temperature of the mixture was raised to about 78–80° C. A continuous stream of dry nitrogen was passed through the reaction vessel, and the mixture was stirred and maintained within this temperature range for about 2 hours. Thereafter, the benzene was evaporated from the reaction mixture and the residue was distilled at reduced pressure. There was obtained 48.6 g. (79.1% yield) of di-o-tolylcarbodiimide; B.P. 150–155° C. at 1.5 mm.

EXAMPLE 2

A solution of phosgene (22.5 g.; 0.23 mole) in 100 ml. of chlorobenzene was added dropwise to a stirred mixture of 1,3-di-o-tolyl-2-thiourea (56.3 g.; 0.22 mole) and 460 ml. of chlorobenzene at about 45° C. during 37 minutes. After about 5 minutes of additional stirring at about 45° C., the temperature of the mixture was raised to about 125–133° C. A continuous stream of dry nitrogen was passed through the reaction vessel, and the mixture was stirred and maintained within this temperature range for about 1 hr. Thereafter, the solvent was evaporated and the residue was distilled at reduced pressure. There was obtained 40.7 g. (83.4% yield) of di-o-tolylcarbodiimide; B.P. 146–149° C. at 0.7 mm.

EXAMPLE 3

A solution of phosgene (10.2 g.; 0.1 mole) in 100 ml. of benzene was added dropwise to a stirred mixture of 1,3-diphenyl-2-thiourea (22.8 g.; 0.1 mole) and 130 ml. of benzene at about 45° C. during 26 minutes. After about 5 minutes of additional stirring at about 45° C., the temperature of the mixture was raised to about 78–80° C. A continuous stream of dry nitrogen was passed through the reaction vessel, and the reaction mixture was stirred and maintained within this higher temperature range for an additional 105 minutes. Thereafter, the solvent was evaporated and the residue was distilled at reduced pressure. There was obtained 10.2 g. (52.6% yield) of diphenylcarbodiimide; B.P. 116–118° C. at 0.7 mm.

EXAMPLE 4

A solution of phosgene (5.0 g.; 0.05 mole) in 40 ml. of chlorobenzene was added dropwise to a stirred mixture of 1,3-di-p-tolyl-2-thiourea (12.8 g.; 0.05 mole) and 90 ml. of chlorobenzene at about 44–46° C. during about 15 minutes. After about 5 minutes of additional stirring at about 44–46° C., the temperature of the mixture was raised to about 130–133° C. A continuous stream of dry nitrogen was passed through the reaction vessel, and the mixture was stirred and maintained within this higher temperature range for about 2 hrs. Thereafter, the solvent was evaporated and the residue was distilled at reduced pressure. There was obtained 4.8 g. (50% yield) of di-p-tolylcarbodiimide; B.P. 142–144° C. at 0.8 mm.; M.P. 57–58° C.

EXAMPLE 5

A solution of phosgene (9.0 g.; 0.09 mole) in 100 ml. of chlorobenzene was added dropwise to a stirred mixture of 1-cyclohexyl-phenyl-2-thiourea (21.0 g.; 0.09 mole) and 110 ml. of chlorobenzene at about 43–47° C. during 30 minutes. After about 5 minutes of additional stirring at about 43–47° C., the temperature of the mixture was raised to about 128–132° C. A continuous stream of dry nitrogen was passed through the reaction vessel, and the mixture was stirred and maintained within this higher temperature range for about 80 minutes. Thereafter, the solvent was evaporated and the residue was distilled at reduced pressure. There was obtained 8.0 g. (44.4% yield) of cyclohexylphenylcarbodiimide, B.P. 105–106° C. at 0.4 mm.

EXAMPLE 6

A solution of phosgene (20.5 g.; 0.21 mole) in 100 ml. of benzene was added dropwise to a stirred mixture of 1,3-di-o-tolyl-2-thiourea (51.2 g.; 0.21 mole) and 120 ml. of benzene at about 25–30° C. during 50 minutes. A precipitate, presumed to be N,N'-di-o-tolyl-1-chloroformamidine hydrochloride, formed and the reaction mixture thickened. After about 4 hrs. of additional stirring at about 25° C., the temperature of the mixture was raised to about 78–80° C. A continuous stream of dry nitrogen was passed through the reaction vessel, and the mixture was stirred and maintained within this higher temperature range for an additional 2 hrs. Benzene was evaporated from the resulting clear solution and the residue was distilled at reduced pressure. There was obtained 19.7 g. (40.4%) of di-o-tolylcarbodiimide. In this example, evolution of a substantial amount of hydrogen chloride was observed during the distillation, and a particularly large amount (17.9 g.) of undistillable residue remained in the flask. Di-o-tolyl-carbodiimide started to distill at 156° C. at 2.4 mm., and, as the amount of hydrogen chloride in the distillation apparatue decreased, the pressure gradually decreased to 0.5 mm. at which point di-o-tolycarbodiimide distilled at 148° C.

EXAMPLE 7

Phosgene gas (22 g.; 0.22 mole) was passed slowly into a stirred mixture of 1,3-di-o-tolyl-2-thiourea and 560 ml. of benzene at 78–80° C. during 20 minutes. A continuous stream of dry nitrogen was then passed through the reaction vessel during about 30 minutes while maintaining the reaction mixture at 78–80° C. Filtration of the resulting reaction mixture gave tri-o-tolylguanidine hydrochloride (24.6 g.; 38%). Evaporation of benzene from the filtrate and fractional distillation of the residue at reduced pressure gave 14.7 g. (45%) of o-tolylisothiocyanate; B.P. 170–172° C. at 1 mm., and 12.7 g. (26%) of di-o-tolylcarbodiimide; B.P. 160–162° C. at 3 mm.

It should be noted that Example 7 is not illustrative of the novel process of this invention but was carried out to demonstrate the importance of a temperature range about 0° to about 60° C. for the first reaction stage. It is apparent from Example 7 that a higher initial tempeature causes the reaction between phosgene and Formula II thiourea to proceed largely in another direction.

Following the procedure of Example 1 or Example 2 but substituting for the 1,3-di-o-tolyl-2-thiourea, 1-phenyl-3-(o-tolyl)-2-thiourea;
1,3-bis(o-chlorophenyl)-2-thiourea;
1,3-dimesityl-2-thioureau;
1-(o-anisyl)-3-phenyl-2-thiourea;
1-(p-nitrophenyl)-3-phenyl-2-thiourea;
1-(1-naphthyl)-3-phenyl-2-thiourea;
1,3-bis(p-fluorophenyl)-2-thiourea;
1-(p-diphenyl)-3-(o-tolyl)-2-thiourea;
1-(p-dimethylaminophenyl)-3-phenyl-2-thiourea;
1-hexyl-3-phenyl-2-thiourea;
1-(4-chlorobutyl)-3-phenyl-2-thiourea;
1-cyclopentyl-3-(1-naphthyl)-2-thiourea;
1-cyclohexyl-3-(2,4-dimethoxyphenyl)-2-thiourea;
1-(4-bromocyclohexyl)-3-(p-bromophenyl)-2-thiourea; and
1-(o-anisyl)-3-(2-methoxycyclohexyl)-2-thiourea, there are obtained phenyl(o-tolyl)carbodiimide;
bis(o-chlorophenyl)carbodiimide;
dimesitylcarbodiimide;
o-anisylphenylcarbodiimide;
p-nitrophenylphenylcarbodiimide;
1-naphthylphenylcarbodiimide;
bis(p-fluorophenyl)carbodiimide;
p-diphenyl(o-tolyl)carbodiimide;
p-dimethylaminophenylphenylcarbodiimide;
hexylphenylcarbodiimide;
4-chlorobutylphenylcarbodiimide;
cyclopentyl(1-naphthyl)carbodiimide;
cyclohexyl(2,4-dimethoxyphenyl)carbodiimide;
4-bromocyclohexyl(p-bromophenyl)carbodiimide; and
o-anisyl(2-methoxycyclohexyl)carbodiimide, respectively.

We claim:
1. A process for the preparation of a carbodiimide of the formula:

R—N=C=N—R′ wherein R is aryl of 6 to 12 carbon atoms, inclusive, and with zero to 3 substituents, inclusive, said substituents being unreactive with phosgene, and wherein R′ is selected from the group consisting of aryl of 6 to 12 carbon atoms, inclusive, alkyl of 1 to 18 carbon atoms, inclusive, and cycloalkyl of 3 to 12 carbon atoms, inclusive, said aryl, alkyl, and cycloalkyl each having zero to 3 substituents, inclusive, said substituents being unreactive with phosgene; which comprises mixing substantially equal molecular amounts of phosgene and a thiourea of the formula:

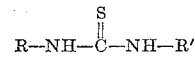

wherein R and R′ are as given above, under substantially anhydrous conditions, in the absence of a substantial amount of an acid acceptor, and within the range 0° to 60° C.; maintaining the resulting mixture of said thiourea and phosgene under substantially anhydrous conditions, in the absence of a substantial amount of an acid acceptor, and within the range 0° to 60° C. until reaction between said thiourea and phosgene is substantially complete; and subsequently heating the entire resulting reaction product mixture under substantially anhydrous conditions, in the absence of a substantial amount of an acid acceptor, and within the range 75° to 200° C., to form said carbodiimide.

2. A process for the preparation of a carbodiimide of the formula:

R—N=C=N—R′ wherein R and R′ are aryl of 6 to 12 carbon atoms, inclusive, and with zero to 3 substituents, inclusive, said substituents being unreactive with phosgene; which comprises mixing substantially equal molecular amounts of phosgene and a thiourea of the formula:

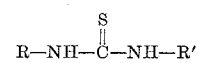

wherein R and R′ are as given above, under substantially anhydrous conditions, in the absence of a substantial amount of an acid acceptor, and within the range 0° to 60° C.; maintaining the resulting mixture of said thiourea and phosgene under substantially anhydrous conditions, in the absence of a substantial amount of an acid acceptor, and within the range 0° to 60° C. until reaction between said thiourea and phosgene is substantially complete; and subsequently heating the entire resulting reaction product mixture under substantially anhydrous conditions, in the absence of a substantial amount of an acid acceptor, and within the range 75° to 200° C., to form said carbodiimide.

3. A process for the preparation of a carbodiimide of the formula

R—N=C=N—R′ wherein R and R′ are aryl of 6 to 12 carbon atoms, inclusive, and with zero to 3 substituents, inclusive, said substituents being unreactive with phosgene, which comprises mixing substantially equal molecular amounts of phosgene and a thiourea of the formula:

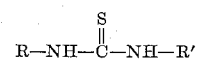

wherein R and R′ are as given above, under substantially anhydrous conditions, in the absence of a substantial amount of an acid acceptor, and within the range 35° to 50° C.; maintaining the resulting mixture of said thiourea and phosgene under substantially anhydrous conditions, in the absence of a substantial amount of an acid acceptor, and within the range 35° to 50° C. until reaction between said thiourea and phosgene is substantially complete; and subsequently heating the entire resulting reaction product mixture under substantially anhydrous conditions, in the absence of a substantial amount of an acid acceptor, and within the range 75° to 150° C., to form said carbodiimide.

4. A process according to claim 3 wherein R and R′ each contain at least 1 ortho substituent.

5. A process according to claim 3 wherein R and R′ are orthotolyl.

6. A process for the preparation of a carbodiimide of the formula:

$$R-N=C=N-R'$$

wherein R is aryl of 6 to 12 carbon atoms, inclusive, and with zero to 3 substituents, inclusive, said substituents being unreactive with phosgene, and wherein R' is selected from the group consisting of aryl of 6 to 12 carbon atoms, inclusive, alkyl of 1 to 18 carbon atoms, inclusive, and cycloalkyl of 3 to 12 carbon atoms, inclusive, said aryl, alkyl, and cycloalkyl each having zero to 3 substituents, inclusive, said substituents being unreactive with phosgene; which comprises heating a compound of the formula

wherein R and R' are as given above, within the range 75° to 200° C., under substantially anhydrous conditions, and in the absence of a substantial amount of an acid acceptor, to form said carbodiimide.

7. A process for the preparation of a carbodiimide of the formula:

$$R-N=C=N-R'$$

wherein R is aryl of 6 to 12 carbon atoms, inclusive, and with zero to 3 substituents, inclusive, said substituents being unreactive with phosgene, and wherein R' is selected from the group consisting of aryl of 6 to 12 carbon atoms, inclusive, alkyl of 1 to 18 carbon atoms, inclusive, and cycloalkyl of 3 to 12 carbon atoms, inclusive, said aryl, alkyl, and cycloalkyl each having zero to 3 substituents, inclusive, said substituents being unreactive with phosgene; which comprises heating a compound of the formula:

wherein R and R' are as given above, within the range 75° to 200° C., under substantially anhydrous conditions, and in the absence of a substantial amount of an acid acceptor, while passing an inert gas through the reaction mixture to remove hydrogen chloride as formed, to form said carbodiimide.

8. A process for the preparation of a carbodiimide of the formula:

$$R-N=C=N-R'$$

wherein R and R' are aryl of 6 to 12 carbon atoms, inclusive, and with zero to 3 substituents, inclusive, said substituents being unreactive with phosgene, which comprises heating a compound of the formula:

wherein R and R' are as given above, within the range 75° to 200° C., under substantially anhydrous conditions, and in the absence of a substantial amount of an acid acceptor, to form said carbodiimide.

9. A process for the preparation of a carbodiimide of the formula:

$$R-N=C=N-R'$$

wherein R and R' are aryl of 6 to 12 carbon atoms, inclusive, and with zero to 3 substituents, inclusive, said substituents being unreactive with phospene, which comprises heating a compound of the formula:

wherein R and R' are as given above, within the range 75° to 200° C., under substantially anhydrous conditions, and in the absence of a substantial amount of an acid acceptor, while passing an inert gas through the reaction mixture to remove hydrogen chloride as formed, to form said carbodiimide.

10. A process for the preparation of a carbodiimide of the formula:

$$R-N=C=N-R'$$

wherein R is aryl of 6 to 12 carbon atoms, inclusive, and wherein R' is selected from the group consisting of aryl of 6 to 12 carbon atoms, inclusive, alkyl of 1 to 18 carbon atoms, inclusive, and cycloalkyl of 3 to 12 carbon atoms, inclusive; which comprises mixing substantially equal molecular amounts of phosgene and a thiourea of the formula:

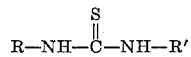

wherein R and R' are as given above, under substantially anhydrous conditions, in the absence of a substantial amount of an acid acceptor, and within the range 0° to 60° C.; maintaining the resulting mixture of said thiourea and phosgene under substantially anhydrous conditions, in the absence of a substantial amount of an acid acceptor, and within the range 0° to 60° C. until reaction between said thiourea and phosgene is substantially complete; and subsequently heating the entire resulting reaction product mixture under substantially anhydrous conditions, in the absence of a substantial amount of an acid acceptor, and within the range 75° to 200° C., to form said carbodiimide.

11. A process for the preparation of a carbodiimide of the formula:

$$R-N=C=N-R'$$

wherein R is aryl of 6 to 12 carbon atoms, inclusive, and wherein R' is selected from the group consisting of aryl of 6 to 12 carbon atoms, inclusive, alkyl of 1 to 18 carbon atoms, inclusive, and cycloalkyl of 3 to 12 carbon atoms, inclusive; said aryl having 1 to 3 substituents, inclusive, selected from the group consisting of alkyl, halo, dialkylamino, nitro, cyano, alkoxycarbonyl, alkoxy, and alkylthio, and said alkyl and cycloalkyl having 1 to 3 substituents, inclusive, selected from the group consisting of alkyl, halo, dialkylamino, nitro, cyano, and alkoxycarbonyl; which comprises mixing substantially equal molecular amounts of phosgene and a thiourea of the formula:

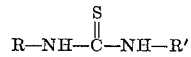

wherein R and R' are is given above, under substantially anhydrous conditions, in the absence of a substantial amount of an acid acceptor, and within the range 0° to 60° C.; maintaining the resulting mixture of said thiourea and phosgene under substantially anhydrous conditions, in the absence of a substantial amount of an acid acceptor, and within the range 0° to 60° C. until reaction between said thiourea and phosgene is substantially complete; and subsequently heating the entire resulting reaction product mixture under substantially anhydrous conditions, in the absence of a substantial amount of an acid acceptor, and within the range 75° to 200° C., to form said carbodiimide.

12. A process for the preparation of a carbodiimide of the formula:

$$R-N=C=N-R'$$

wherein R is aryl of 6 to 12 carbon atoms, inclusive, and wherein R' is selected from the group consisting of aryl of 6 to 12 carbon atoms, inclusive, alkyl of 1 to 18 carbon atoms, inclusive, and cycloalkyl of 3 to 12 carbon atoms, inclusive; which comprises heating a compound of the formula:

wherein R and R' are as given above, within the range 75° to 200° C., under substantially anhydrous conditions, and in the absence of a substantial amount of an acid acceptor, to form said carbodiimide.

13. A process for the preparation of a carbodiimide of the formula:

$$R-N=C=N-R'$$

wherein R is aryl of 6 to 12 carbon atoms, inclusive, and wherein R' is selected from the group consisting of aryl of 6 to 12 carbon atoms, inclusive, alkyl of 1 to 18 carbon atoms, inclusive, and cycloalkyl of 3 to 12 carbon atoms, inclusive, said aryl having 1 to 3 substituents, inclusive, selected from the group consisting of alkyl, halo, dialkylamino, nitro, cyano, alkoxycarbonyl, alkoxy, and alkylthio, and said alkyl and cycloalkyl having 1 to 3 substituents, inclusive, selected from the group consisting of alkyl, halo, dialkylamino, nitro, cyano, and alkoxycarbonyl; which comprises heating a compound of the formula:

wherein R and R' are as given above, within the range 75° to 200° C., under substantially anhydrous conditions, and in the absence of a substantial amount of an acid acceptor, to form said carbodiimide.

References Cited by the Examiner

UNITED STATES PATENTS 2,845,458    7/1959    Lecher et al.

FOREIGN PATENTS 1,119,258    12/1961    Germany.
1,125,914    3/1962    Germany.

OTHER REFERENCES

Beilstein, 4th ed., band 12, pages 397 and 449 (systems 1592 and 1739).

Verlag von Springer (Berlin) 1929.

Will, Ber. Deut. Chem., vol. 14, pp. 1485–92 (1881).

WALTER A. MODANCE, *Primary Examiner.*

NICHOLAS S. RIZZO, *Examiner.*

EGON E. BERG, HARRY I. MOATZ,
*Assistant Examiners.*